(12) United States Patent
Kochi et al.

(10) Patent No.: US 11,727,723 B2
(45) Date of Patent: Aug. 15, 2023

(54) INFORMATION PROCESSING DEVICE (71) Applicant: NEC Corporation, Tokyo (JP)

(72) Inventors: Taketo Kochi, Tokyo (JP); Kenji Saito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/717,266

(22) Filed: Apr. 11, 2022

(65) Prior Publication Data

US 2022/0230470 A1    Jul. 21, 2022

Related U.S. Application Data

(63) Continuation of application No. 16/965,097, filed as application No. PCT/JP2019/002335 on Jan. 24, 2019, now Pat. No. 11,335,125.

(30) Foreign Application Priority Data

Jan. 31, 2018  (JP) ................................. 2018-014275

(51) Int. Cl.
*G06V 40/16* (2022.01)
*G06T 7/62* (2017.01)
*G06T 7/70* (2017.01)
*G07C 9/10* (2020.01)

(52) U.S. Cl.
CPC .............. *G06V 40/172* (2022.01); *G06T 7/62* (2017.01); *G06T 7/70* (2017.01); *G06V 40/168* (2022.01); *G07C 9/10* (2020.01)

(58) Field of Classification Search
CPC .. G06K 9/00288; G06K 9/00268; G06T 7/62; G06T 7/70; G07C 9/10
See application file for complete search history.

(56) References Cited

U.S. PATENT DOCUMENTS

| 2006/0204050 A1* | 9/2006 | Takizawa | G06V 40/67 382/115 |
| 2007/0242860 A1* | 10/2007 | Hasebe | G06V 40/166 382/118 |
| 2007/0291998 A1* | 12/2007 | Takizawa | G07C 9/37 382/118 |
| 2008/0080748 A1* | 4/2008 | Sukegawa | G06V 40/10 382/118 |

(Continued)

FOREIGN PATENT DOCUMENTS

| JP | 2006-236244 A | 9/2006 |
| JP | 2007-146986 A | 6/2007 |

(Continued)

OTHER PUBLICATIONS

International Search Report for PCT Application No. PCT/JP2019/002335, dated Mar. 5, 2019.

(Continued)

*Primary Examiner* — Md K Talukder (57) ABSTRACT

An information processing device of the present invention includes: an image processing means that extracts a feature value of an object within a captured image obtained by capturing a pre-passing region of a gate, and stores matching information relating to matching of the object based on the feature value; a distance estimating means that estimates a distance from the gate to the object within the captured image; and a matching means that executes matching determination based on the estimated distance and the stored matching information of the object that the distance has been estimated.

18 Claims, 9 Drawing Sheets

(56) References Cited

U.S. PATENT DOCUMENTS

| | | | |
|---|---|---|---|
| 2009/0060384 A1 | 3/2009 | Hayaishi | |
| 2010/0130152 A1* | 5/2010 | Whikehart | H04B 1/1036 |
| | | | 455/150.1 |
| 2012/0121126 A1* | 5/2012 | Hwang | G06T 7/593 |
| | | | 382/103 |
| 2016/0295171 A1* | 10/2016 | Van Den Brink | G06V 20/52 |
| 2017/0289633 A1 | 10/2017 | Tokunaga et al. | |
| 2018/0068172 A1* | 3/2018 | Despiegel | G06V 40/168 |
| 2021/0117655 A1* | 4/2021 | Kochi | G07C 9/10 |

FOREIGN PATENT DOCUMENTS

| | | |
|---|---|---|
| JP | 2007-148987 A | 6/2007 |
| JP | 2007-326572 A | 12/2007 |
| JP | 2009-053914 A | 3/2009 |
| JP | 2015-001790 A | 1/2015 |
| JP | 2016-083225 A | 5/2016 |

OTHER PUBLICATIONS

Japanese Office Action for JP Application No. 2018-014278 dated Feb. 26, 2019 with English Translation.

Japanese Office Action for JP Application No. 2018-014275 dated Sep. 10, 2019 with English Translation.

Japanese Office Action for JP Application No. 2019-187096 dated Feb. 10, 2021 with English Translation.

Extended European Search Report for EP Application No. EP19747048.7 dated Feb. 25, 2021.

\* cited by examiner

Fig.9 ical application Ser. No. 16/965,097 filed on Jul. 27, 2020, which is a National Stage Entry of international application PCT/JP2019/002335 filed on Jan. 24, 2019, which claims the benefit of priority from Japanese Patent Application 2018-014275 filed on Jan. 31, 2018, the disclosures of all of which are incorporated in their entirety by reference herein.

TECHNICAL FIELD

The present invention relates to an information processing device, an information processing system, a program, and an information processing method.

BACKGROUND ART

As a means for restricting and managing persons who enter and exit a specific place such as an office or an event venue, a matching system is used that checks whether or not a person who is about to pass through is a previously registered person. In particular, in recent years, a walk-through face authentication system that performs face authentication based on the face image of a person captured by a camera installed at a gate has been used owing to development of a person face authentication technology.
Patent Document 1: Japanese Unexamined Patent Application Publication No. JP-A 2016-083225

A walk-through face authentication system needs to perform matching of persons who are in a line at a gate in order and to open and close the gate so that the persons can smoothly pass through the gate. However, there are various persons who are going to pass through the gate, and it is difficult to properly determine their sequence. As a result, there arises a problem that smoothly passing through the gate is difficult.

SUMMARY

Accordingly, an object of the present invention is to solve the abovementioned problem that smoothly passing through the gate is difficult.

An information processing device according to an aspect of the present invention includes: an image processing means that extracts a feature value of an object within a captured image obtained by capturing a pre-passing region of a gate, and stores matching information relating to matching of the object based on the feature value; a distance estimating means that estimates a distance from the gate to the object within the captured image; and a matching means that executes matching determination based on the estimated distance and the stored matching information of the object that the distance has been estimated.

Further, an information processing system according to another aspect of the present invention includes: a capturing means that acquires a captured image obtained by capturing a pre-passing region of a gate; an image processing means that extracts a feature value of an object within the captured image, and stores matching information relating to matching of the object based on the feature value; a distance estimating means that estimates a distance from the gate to the object within the captured image; and a matching means that executes matching determination based on the estimated distance and the stored matching information of the object that the distance has been estimated.

Further, a program according to another aspect of the present invention includes instructions for causing an information processing device to realize: an image processing means that extracts a feature value of an object within a captured image obtained by capturing a pre-passing region of a gate, and stores matching information relating to matching of the object based on the feature value; a distance estimating means that estimates a distance from the gate to the object within the captured image; and a matching means that executes matching determination based on the estimated distance and the stored matching information of the object that the distance has been estimated.

Further, an information processing method according to another aspect of the present invention includes: extracting a feature value of an object within a captured image obtained by capturing a pre-passing region of a gate, and storing matching information relating to matching of the object based on the feature value; estimating a distance from the gate to the object within the captured image; and executing matching determination based on the estimated distance and the stored matching information of the object that the distance has been estimated.

With the configurations as described above, the present invention can provide an information processing device which can realize smoothly passing through a gate.

EXAMPLE EMBODIMENTS

First Example Embodiment

Figure 1:
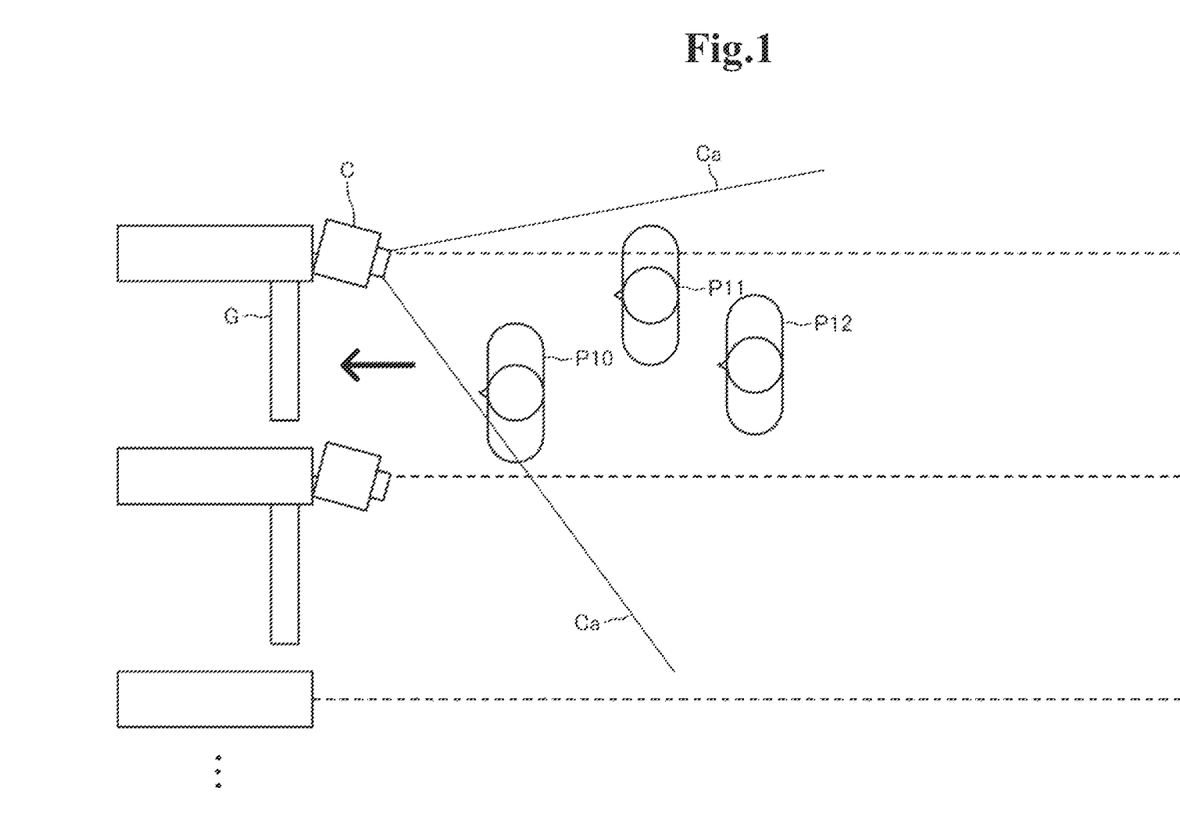
FIG. 1 is a view showing a situation in which a face authentication system in a first example embodiment of the present invention is used.
Figure 2:
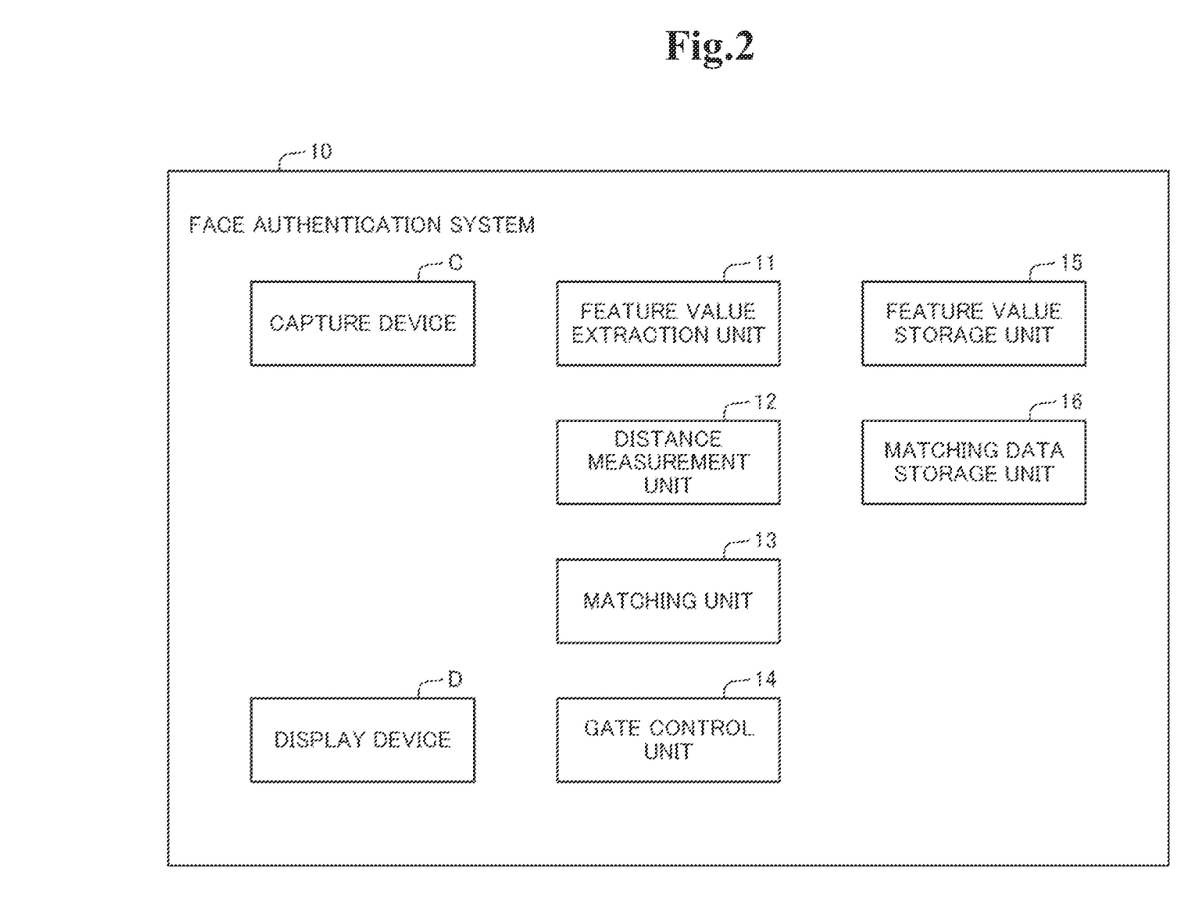
FIG. 2 is a block diagram showing the configuration of the face authentication system in the first example embodiment of the present invention.

A first example embodiment of the present invention will be described with reference to FIGS. 1 to 6. FIG. 1 is a view showing a situation in which a face authentication system is used. FIG. 2 is a view showing the configuration of the face authentication system. FIGS. 3 to 6 are views for describing a processing operation by the face authentication system.

[General Configuration]

A face authentication system 10 (an information processing system) according to the present invention is a system used for restricting and managing entry/exit of a person (an object) in a specific place such as an office or an event venue. For example, a capture device C included by the face authentication system 10 is installed, for each gate that is opened/closed when a person enters/exits, near a place in which the gate is set up.

In an example shown in FIG. 1, a plurality of gates G are arranged in parallel and adjacent to each other, and configured so that persons pass in a direction indicated by an arrow from the right side of FIG. 1 to the gates G. Therefore, a region on the right side in FIG. 1 with reference to each of the gates G is a region where persons remain before passing through the gate (a pre-passing side region). In the pre-passing side regions of the gates G, lanes in which persons who are going to pass through the gates G make lines and pass are located in parallel so as to correspond to the gates G, respectively. The lanes may be or may not be partitioned by some member. In addition, although a case in which a plurality of gates G are arranged adjacent to each other is illustrated in this example embodiment, the number of the gates G may be one.

In the situation shown in FIG. 1, the capture device C included by the face authentication system 10 in this example embodiment is installed near the corresponding gate G and on the right side in view of a person heading to the gate G. However, a position to install the capture device is not limited to the position shown in FIG. 1, and may be any position such as on the left side of the gate or above the gate. Besides, the face authentication system 10 also includes display devices D in the vicinity of the respective capture devices C.

The face authentication system 10 captures an image of a person heading to the gate G by the capture device C included by the system. Then, the face authentication system 10 executes a process of matching to check whether or not the person shown in the captured image is a previously registered person based on the face image of the person and, when the matching succeeds, opening the gate G so that the person can pass through. Below, the configuration of the face authentication system 10 will be described in detail.

[Configuration of Face Authentication System]

The face authentication system 10 in this example embodiment is an information processing device including an arithmetic device and a storage device, configured integrally with the capture device C (a camera) and the display device D (a display). In other words, the capture device C is equipped with the information processing device executing a face authentication process including the arithmetic device and the storage device and with the display device D. However, the face authentication system 10 is not necessarily limited to being configured integrally with the capture device C and the display device D. For example, the capture device C, the display device D, and the information processing device processing a captured image may be configured by separate devices and installed in separate places.

To be specific, as shown in FIG. 2, the face authentication system 10 includes the capture device C and the display device D, and also includes a feature value extraction unit 11, a distance measurement unit 12, a matching unit 13 and a gate control unit 14 that are structured by execution of a program by the arithmetic device. Moreover, the face authentication system 10 includes a feature value storage unit 15 and a matching data storage unit 16 that are structured in the storage device.

The abovementioned capture device C (a capturing means) includes a camera and a camera control unit that acquire captured images of the pre-passing side region with reference to the gate G, that is, a region before gate in the corresponding lane at predetermined frame rates. For the capture device C, for example, as shown in FIG. 1, a range sandwiched between lines denoted by reference symbol Ca is a capture region. For example, in a case where three persons P10, P11, and P12 are in a lane as shown in FIG. 1, a captured image captured by the capture device C is as shown in the upper view of FIG. 3. A captured image is set to be substantially in focus within a range of a preset distance in the perspective direction with reference to the capture device C.

When a captured image is captured by the capture device C, the feature value extraction unit 11 (an image processing means) executes a process of extracting a person within the captured image to extract the feature value of the person first. To be specific, the feature value extraction unit 11 extracts a person within the captured image, targets all the extracted persons, and generates a feature value necessary for matching from the face region of each of the persons. The feature value is, for example, information used by the matching unit 13 later to calculate a matching score such as the degree of similarity to the feature value of a person previously registered in the matching data storage unit 16 and execute a matching process. The feature value may be a feature value used in the existing face matching technique, or may be a feature value calculated by another method.

Then, the feature value extraction unit 11 stores the extracted feature value as information relating to person matching, that is, information used for the matching process (matching information) into the feature value storage unit 15. At this time, the feature value is stored into the feature value storage unit 15 in association with information for identifying the person within the captured image. The person within the captured image may be tracked in a subsequent captured image. In such a case, the tracked person and the feature value in the feature value storage unit 15 are associated with each other.

Further, the feature value extraction unit 11 may store a plurality of feature values with respect to one person by extracting feature values from different captured images, respectively. Moreover, the feature value extraction unit 11 may store only one feature value when extracting feature values from different captured images. That is, in the case of extracting a feature value every time a captured image is acquired with respect to the same person, the feature value extraction unit 11 may update and store only one feature value. For example, the feature value extraction unit 11 may judge the qualities of the extracted feature values and store only one feature value of the highest quality in association with the person.

The feature value extraction unit 11 may execute the matching process by using the matching unit 13 to be described later. In this case, the feature value extraction unit 11 issues a matching instruction to the matching unit 13 to execute the matching process of matching between the feature value of the person within the captured image extracted as described above and a previously registered person. Then, the feature value extraction unit 11 may acquire the result of the matching by the matching unit 13 and store the matching result as the matching information relating to person matching into the feature value storage unit 15. At this time, the feature value is stored into the feature value storage unit 15 in association with the information for identifying the person within the captured image.

The person within the captured image may be tracked in a subsequent captured image. In such a case, the tracked person and the matching result in the feature value storage unit 15 are associated with each other. At this time, the feature value extraction and the matching process may be executed on a plurality of captured images. In such a case, only one matching result may be updated and stored in association with the person.

The abovementioned distance measurement unit 12 (a distance estimating means) measures the distance from the gate G to the person within the captured image that the feature value has been extracted as described above. At this time, in this example embodiment, the distance measurement unit 12 uses an image portion of the person within the captured image to measure the distance from the gate G to the person. To be specific, the distance measurement unit 12 measures the distance in the following manner.

The distance measurement unit 12 first sets a reference value which is necessary for measurement of the distance to the person within the captured image. To be specific, the distance measurement unit 12 extracts an image portion of the face region of the person to be processed from the captured image. The extraction of the face region of the person is performed, for example, by judging the position of a moving person with reference to the entire image, the color of the person, or the like. Then, the distance measurement unit 12 executes an attribute analysis process of identifying the attribute of the person from the image portion of the face region. Herein, the attribute of the person is, for example, gender, age (generation, adult, child), and race.

In the attribute analysis process, for example, the distance measurement unit 12 identifies the attribute of the person by extracting attribute identification information that is information necessary for identifying the attribute from the image portion of the face region, and comparing the extracted attribute identification information with previously registered attribute identification reference information. Herein, the attribute identification information is, for example, information representing a physical characteristic that generally appears in the face region of a person for each attribute such as gender or age. Because the attribute analysis process of identifying the attribute such as gender or age (generation) of the person can be realized by the existing technique, the detailed description of the process will be omitted. The attribute that can be identified is not limited to the abovementioned attributes, and may be any attribute.

Then, the distance measurement unit 12 sets a reference value corresponding to the identified attribute of the person. Herein, the reference value is previously registered in the storage device included by the face authentication system 10. For example, in this example embodiment, a reference value of an eye-to-eye distance representing the distance between both the eyes of a person is registered for each attribute. As an example, in a case where a certain numerical value is registered as an eye-to-eye distance that is the reference value of an attribute "male", an eye-to-eye distance that is the reference value of an attribute "female" is set to a smaller value than the reference value of the attribute "male". Moreover, for example, in a case where a certain numerical value is registered as an eye-to-eye distance that is the reference value of an attribute "adult" with age 15 years old to 70s, an eye-to-eye distance that is the reference value of an attribute "child" with age less than 15 years old is set to a smaller value than the reference value of the attribute "adult". Thus, the reference value is a value corresponding to a general physical constitution of the attribute of a person. Then, the distance measurement unit 12 sets the reference value registered corresponding to the attribute identified with respect to the person extracted from the captured image, as the reference value of the person.

Furthermore, the distance measurement unit 12 measures the distance to the person by using the reference value set for the person as described above. To be specific, the distance measurement unit 12 firstly detects, as object information representing the feature of the person within the captured image, an eye-to-eye distance representing the distance between both the eyes of the person from an image portion of the face region of the person. For example, the distance measurement unit 12 detects the eye-to-eye distances of the persons P10, P11 and P12 within the captured image as denoted reference values d10, d11 and d12 in the lower view of FIG. 3. Then, the distance measurement unit 12 compares the eye-to-eye distances d10, d11 and d12 having been detected with the reference values set for the persons P10, P11 and P12, and thereby measures the distances from the gate G to the respective persons. For example, the distance measurement unit 12 measures the distance between the gate G and the person based on the difference between the reference value set for the person and the eye-to-eye distance detected from the person or on the ratio of the difference. The distance measurement unit 12 may measure the relative distance of the person within the captured image, that is, what the person's order to the gate G is, as the distance to the gate G.

Figure 3:
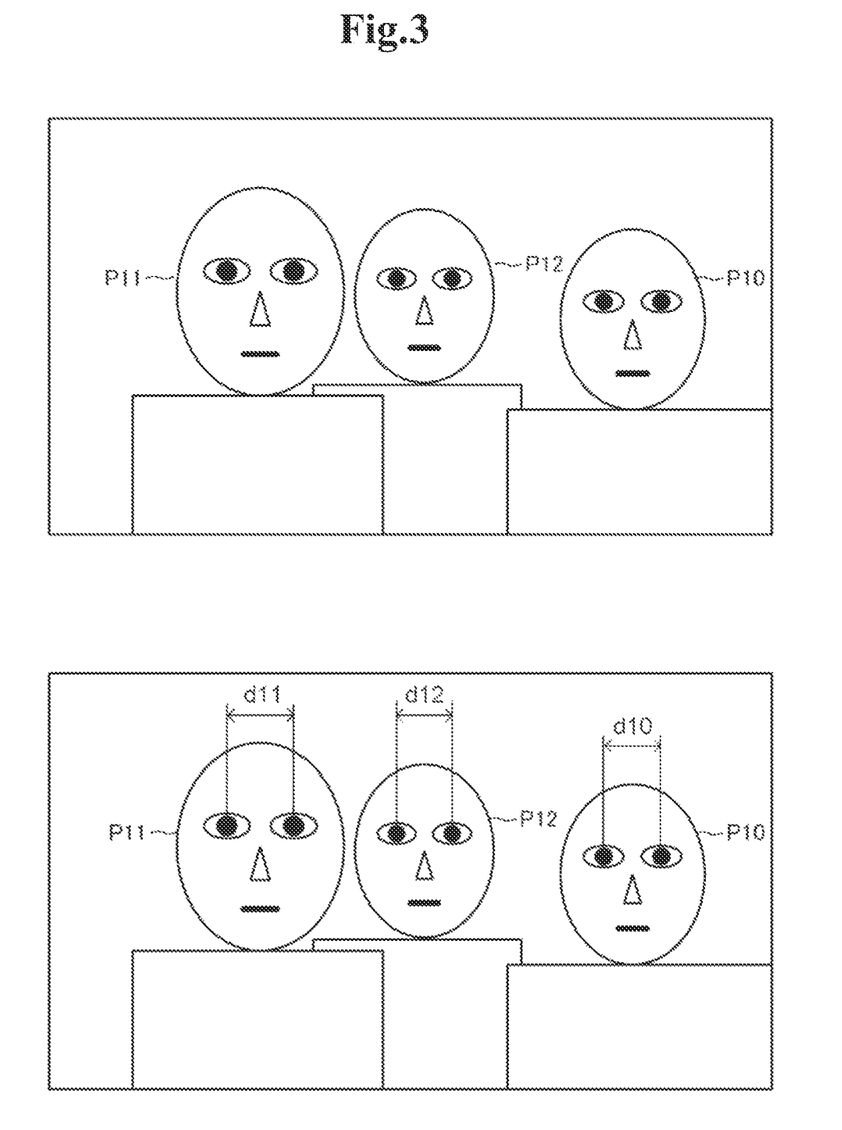
FIG. 3 is a view showing a situation in which an image is captured by the face authentication system disclosed in FIG. 1.
Figure 4:
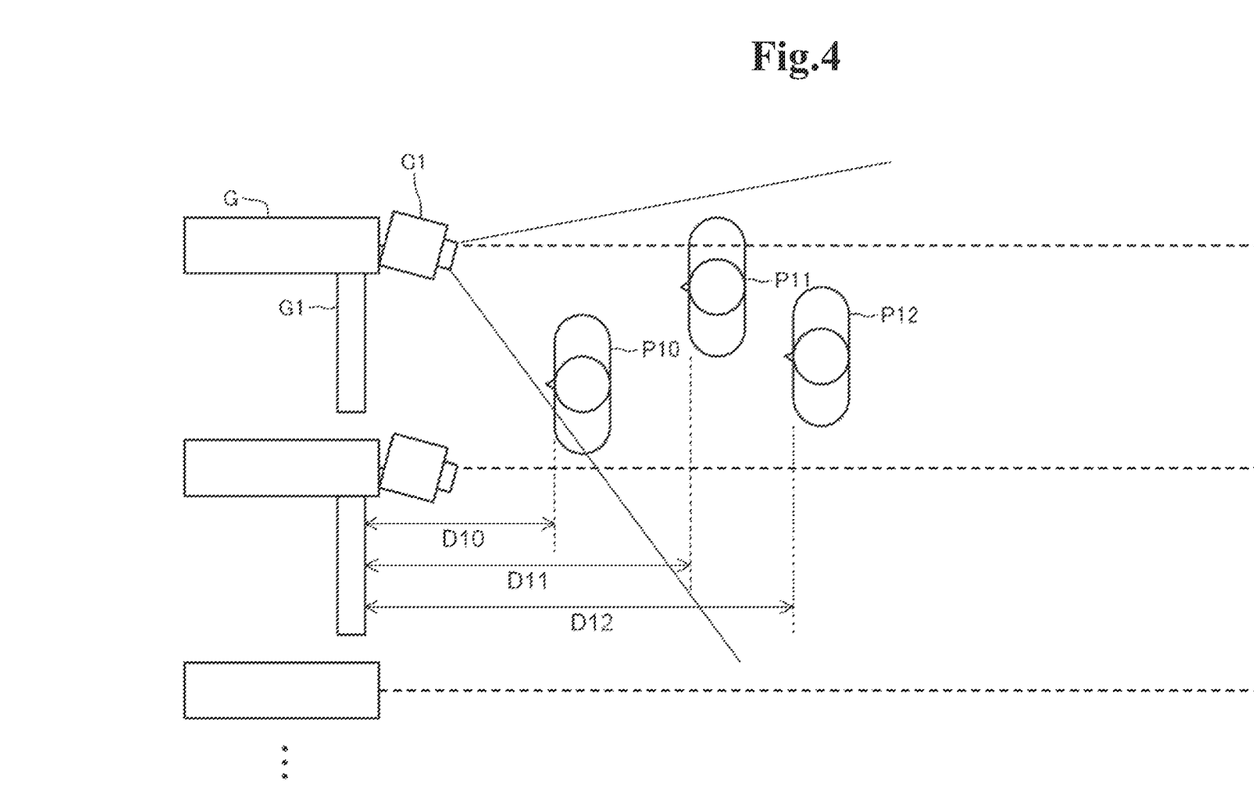
FIG. 4 is a view showing a situation in which the face authentication system disclosed in FIG. 1 is used.

Herein, an example of measurement of the distances from the gate G to the persons P10, P11 and P12 will be described. In the example of FIG. 1, the persons P10, P11 and P12 are in a line in the order of the person P10, the person P11 and the person P12 to the gate G, and the captured image is captured as shown in the lower view of FIG. 3. At this time, when the physical constitutions and face sizes of the persons P10, P11 and P12 are almost the same, the eye-to-eye distances d10, d11 and d12 of the persons P10, P11 and P12 are generally d10>d11>d12. Meanwhile, when the person P10 is a child and the persons P11 and P12 are adults, it is generally thought that a child has a smaller face and a shorter eye-to-eye distance, so that the actually measured eye-to-eye distances are d11>d12>d10. According to this example embodiment, in such a situation, the attribute of the person P10 is identified to be "child", a reference value of a smaller value is set, and the distance is measured using the reference value and the detected eye-to-eye distance d10. Then, the attributes of the persons P11 and P12 are identified to be "adult", a reference value of a larger value than the reference value for child is set, and the distances are measured using the reference value and the detected eye-to-eye distances d11 and d12. Consequently, as shown in FIG. 4, it is possible to measure distances D10, D11 and D12 to the respective persons so as to be in order of the person P10, the person P11 and the person P12 with reference to the gate G in the same order as the actual order to the gate G.

Then, the distance measurement unit 12 associates the measured distance with the person within the captured image, so that the distance is also associated with the feature value of the same person stored in the feature value storage unit 15. The person within the captured image may be tracked in a subsequent captured image and, in such a case, the measurement of the distance is performed on the tracked person in the same manner as described above, and the distance associated with the person is updated. The correspondence of persons within captured images that are temporally different from each other can be realized by tracking feature points, or the like.

The method for detecting the eye-to-eye distance by the distance measurement unit 12 is not limited to the method described above, and any method may be used. Moreover, the distance measurement unit 12 may measure the distance by detecting the size of another site of the person or another characteristic of the person as the object information, instead of the eye-to-eye distance. In this case, the reference value described above also becomes a value corresponding to the object information.

The distance measurement unit 12 is not necessarily limited to measuring the distance from the gate G to a person. For example, the distance measurement unit 12 may estimate the relative positional relation between persons with reference to the gate. As an example, the distance measurement unit 12 may estimate the proximity of each of persons to the gate, that is, the perspective relation between the persons with reference to the gate G, based on the object information such as the eye-to-eye distance described above and the reference value.

The matching unit 13 (a matching means) executes a process of matching between a person within a captured image and a previously registered person. At this time, the matching unit 13 executes the matching process based on the distance to the person measured as described above. For example, in a case where a person is located in a predetermined range located at a preset distance from the gate G set immediately before the gate G and the person is located the closest to the gate G within the captured image, the matching unit 13 executes the matching process on the person. The matching unit 13 may execute the matching process on a person simply when the person is located in a predetermined range located at a preset distance from the gate G set immediately before the gate G, or may execute the matching process on a person based on another criterion in accordance with the distance to the person. Moreover, in a case where the distance measurement unit 12 estimates only the relative positional relation between persons with reference to the gate G as described above, the matching unit 13 may execute the matching process on the person who is the closest to the gate G based on the positional relation.

The matching process by the matching unit 13 is executed using a feature value stored in the feature value storage unit 15 of a person to be processed based on the distance as described above. That is, the matching unit 13 does not newly generate a feature value from the face region of a person within a captured image. The matching unit 13 executes the matching by calculating a matching score such as the degree of similarity between the feature value stored in the feature value storage unit 15 and the feature value of a person previously registered in the matching data storage unit 16, and determining whether or not the matching score is higher than a threshold value. In a case where the matching score is higher than the threshold value, the matching unit 13 determines that the matching succeeds, and determines that the person who is about to pass through the gate G is the previously registered person. The matching method may be any method.

In a case where, on a person to be processed based on a distance, the matching process has already been executed according to an instruction by the feature value extraction unit 11 in the abovementioned manner, or the result of the matching has been stored in the feature value storage unit 15, the matching unit 13 only confirms the result of the matching. That is, the matching unit 13 checks success or failure of the matching result as stored matching information about the person to be processed based on the distance to determine whether or not the matching succeeds.

The gate control unit 14 (a gate controlling means) first determines whether or not a person is permitted to pass through the gate G based on the result of the matching by the matching unit 13. To be specific, the gate control unit 14 determines a person successfully matched by the matching unit 13 to be permitted to pass through. Moreover, the gate control unit 14 has a function to display the matching result, that is, success or failure of the matching onto the display device D. Moreover, the gate control unit 14 has a gate control function to open and close the gate G, and controls the gate G to open for a person determined to be permitted to pass through.

The display device D is placed with its display screen facing the pre-passing side region of the gate G so that a person who is about to pass through the gate G can visually recognize. Meanwhile, the display device D may not be installed necessarily.

[Operation]

Figure 5:
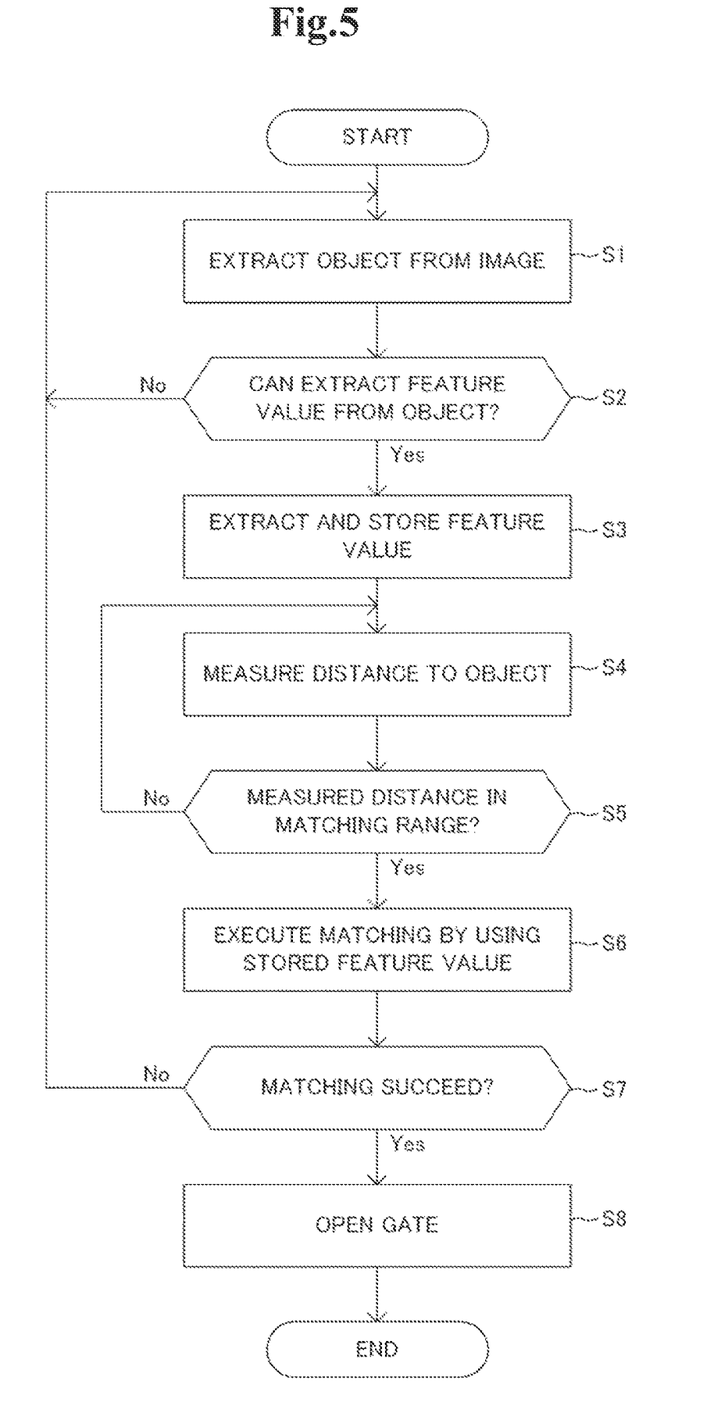
FIG. 5 is a flowchart showing a processing operation by the face authentication system disclosed in FIG. 1.
Figure 6:
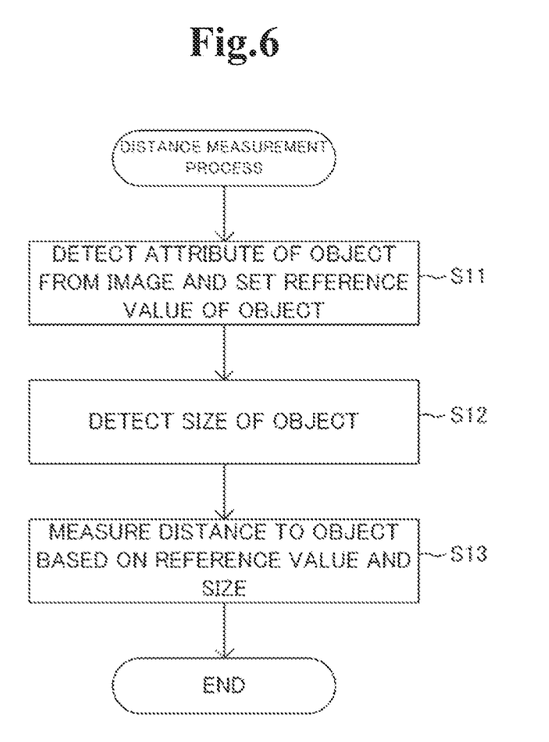
FIG. 6 is a flowchart showing a processing operation by the face authentication system disclosed in FIG. 1.

Next, an operation of the abovementioned face authentication system 10 will be described with reference to flowcharts of FIGS. 5 and 6. Herein, the operation of the face authentication system 10 corresponding to the gate G will be described using a case where persons are in a line with reference to the gate G as shown in FIGS. 3 and 4 as an example.

The capture device C corresponding to the gate G keeps capturing images of the pre-passing side region of the gate G. Then, the face authentication system 10 executes the following process at all times on the captured images having been captured.

First, the feature value extraction unit 11 extracts the persons (objects) P10, P11 and P12 to be processed from the captured image (step S1). When it is possible to extract the feature value of the extracted person under the situation of the captured image (Yes at step S2), the feature value extraction unit 11 generates a feature value that is necessary for the matching from a face region of the person (step S3). Then, the feature value extraction unit 11 stores the extracted feature value into the feature value storage unit 15 in association with the person within the captured image. When it is not possible to sufficiently generate the feature value of the person from the captured image because, for example, the captured image does not clearly show the face region of the person or the front of the face is not shown (No at step S2), the feature value extraction unit 11 generates the feature value from a subsequent captured image.

Subsequently, the distance measurement unit 12 measures the distance from the gate G to the person within the captured image that the feature value has been extracted (step S4). Herein, the process of measuring the distance by the distance measurement unit 12 will be described with reference to the flowchart of FIG. 6.

The distance measurement unit 12 executes the attribute analysis process on image portions of the face regions of the persons within the captured image, and identifies the attributes of the persons. For example, in the example shown by FIGS. 1 and 3, it is assumed that the attribute of the person P10 is identified as child and the attributes of the persons P11 and P12 are identified as adult. Then, the distance measurement unit 12 sets reference values previously registered in the face authentication system 10 corresponding to the identified attributes of the persons, as the reference values of the persons (step S11). For example, in the example shown by FIGS. 3 and 4, the distance measurement unit 12 sets a reference value corresponding to child for the person P10, and sets a reference value corresponding to adult for the persons P11 and P12.

Subsequently, the distance measurement unit 12 detects the size of a predetermined site that is a person's feature as object information necessary for measuring the distance from a person in a captured image to the gate G, herein, detects the eye-to-eye distance of the person (step S12). For example, the distance measurement unit 12 detects the eye-to-eye distances of the persons P10, P11 and P12 as shown by reference numerals d10, d11 and d12 in the lower view of FIG. 3.

Then, the distance measurement unit 12 measures the distances from the gate G to the persons P10, P11 and P12 by comparing the reference values set for the persons P10, P11 and P12 as described above with the eye-to-eye distances d10, d11 and d12 of the persons P10, P11 and P12 for each person (step S13). For example, in the example shown by the lower view of FIG. 3, the eye-to-eye distance d11 of the person P11 who is the second from the gate among the three persons is shown the largest. However, since the reference values set for the persons P10, P11 and P12 are different, the distances D10, D11 and D12 to the persons are measured so as to be in order of the person P10, the person P11 and the person P12 as shown in FIG. 4 in the same order as the actual order with reference to the gate G.

Subsequently, the matching unit 13 executes the matching process on the respective persons based on the distances to the persons P10, P11 and P12 measured as described above. At this time, in a case where the person is located at a preset distance from the gate G set immediately before the gate G and the person is located the closest to the gate G in the captured image, the matching unit 13 executes the matching process on the person (Yes at step S5, step S6). Therefore, in the example shown by FIG. 4, the matching unit 13 executes the matching process on the person P10 who is the closest to the gate G. To be specific, the matching unit 13 calculates a matching score such as the degree of similarity between the feature value stored in the feature value storage unit 15 in association with the person within the captured image to be processed and a feature value of a person previously registered in the matching data storage unit 16, and determines whether or not the matching score is higher than a threshold value (step S6). When the matching score is higher than the threshold value, the matching unit 13 determines that the matching succeeds (Yes at step S7), and determines that the person who is about to pass through the gate G is the previously registered person.

When the matching of the person P10 located immediately before the gate G succeeds as a result of the matching process by the matching unit 13 (Yes at step S7), the gate control unit 14 permits the person P10 to pass through the gate G, and controls the gate G to open (step S8). At this time, the gate control unit 14 displays "permitted to pass" on the display device D.

Thus, according to the face authentication system 10 in this example embodiment, a feature value is extracted from the face region of a person beforehand in the pre-passing side region of the gate G, and the matching process is executed immediately before the gate, so that it is possible to properly open and close the gate for a person. As a result, it is possible to realize that a person smoothly pass through the gate G.

Further, the feature value of a person is extracted and stored from a captured image captured not only immediately before the gate G but also at any timing when a person heads to the gate G, so that it is possible to extract a highly reliable feature value and execute the matching with accuracy. As a result, it is possible to realize that a person smoothly passes through the gate G.

Although a case in which an object that is about to pass through the gate G is a person is illustrated above, the object is not limited to a person and may be any object. For example, the object may be an object such as baggage. In accordance with this, information used for measuring the distance from the gate G, such as the reference value and the object information representing the feature of the object that are described above, may be information representing any feature that can be detected from an object. Moreover, when executing the matching process, any feature value that can be detected from an object may be used.

Second Example Embodiment

Figure 7:
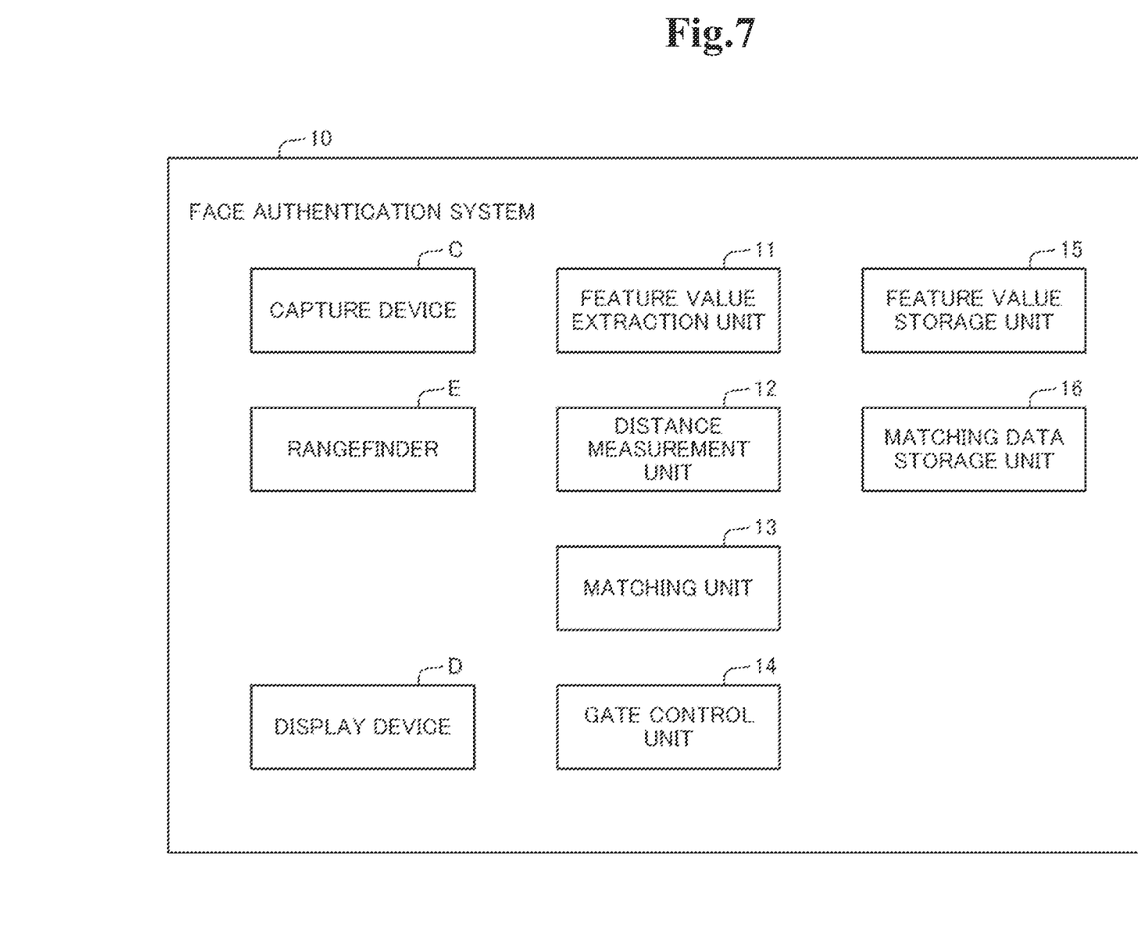
FIG. 7 is a block diagram showing the configuration of an information processing system in a second example embodiment of the present invention.

Next, a second example embodiment of the present invention will be described with reference to FIG. 7. FIG. 7 is a block diagram showing the configuration of a face authentication system.

The face authentication system 10 in this example embodiment is configured almost the same as the face authentication system 10 in the first example embodiment, but is configured to measure the distance from the gate G to a person without using a captured image for extracting a feature value. Below, the configuration different from that of the first example embodiment will be described in detail.

As shown in FIG. 7, the face authentication system 10 in this example embodiment includes a rangefinder E in addition to the configuration of the face authentication system 10 described in the first example embodiment. For example, the rangefinder E is an infrared depth sensor, and is a device which can measure the distance to a person who is in the pre-passing side region of the gate G by using a measured depth that is different information from a captured image for extracting the feature value of a person as described above.

For example, the rangefinder E is installed near the corresponding gate G, on the right side in view of a person heading to the gate G or above the gate in the same manner as the capture device C. In a case where the rangefinder E is configured by a single device, a single rangefinder is installed. In a case where the rangefinder E is configured by a plurality of devices, a plurality of rangefinders are installed. The rangefinder E may be a device that measures the distance to a person by another method.

The distance measurement unit 12 in this example embodiment acquires the measured depth from the rangefinder E, and associates the depth with a person within a captured image. For example, the distance measurement unit 12 specifies a depth at each position in the pre-passing side region of the gate G, and makes the depth correspond to a position in the captured image. With this, it is possible to specify the distance to each person located in the captured image, and associate the distance with the person. Thus, as in the first example embodiment, it is also possible to associate the measured distance with the feature value of the same person stored in the feature value storage unit 15.

The person within the captured image may be tracked in a subsequent captured image and, in such a case, the measurement of the distance is performed on the tracked person in the same manner as described above, and the distance associated with the person is updated. The correspondence of persons within captured images that are temporally different from each other can be realized by tracking feature points, or the like.

The matching unit 13 in this example embodiment executes the matching process based on the measured distance to the person as described above. Such a matching process is as in the first example embodiment. When the person is located immediately before the gate G, the matching unit 13 retrieves the stored feature value on the person to execute the matching process.

The rangefinder E and the distance measurement unit 12 are not limited to measuring the distance from the gate G to a person necessarily. For example, the rangefinder E and the distance measurement unit 12 may estimate the relative positional relation between persons with reference to the gate G. That is, the rangefinder E and the distance measurement unit 12 may estimate the perspective relation between persons with reference to the gate G. Then, the matching unit 13 may execute the matching process on the person who is the closest to the gate G based on the estimated relative positional relation between the persons with reference to the gate G.

With this, it is also possible to properly open and close the gate for a person immediately before the gate, and it is possible to realize that a person smoothly passes through the gate G.

Third Example Embodiment

Figure 8:
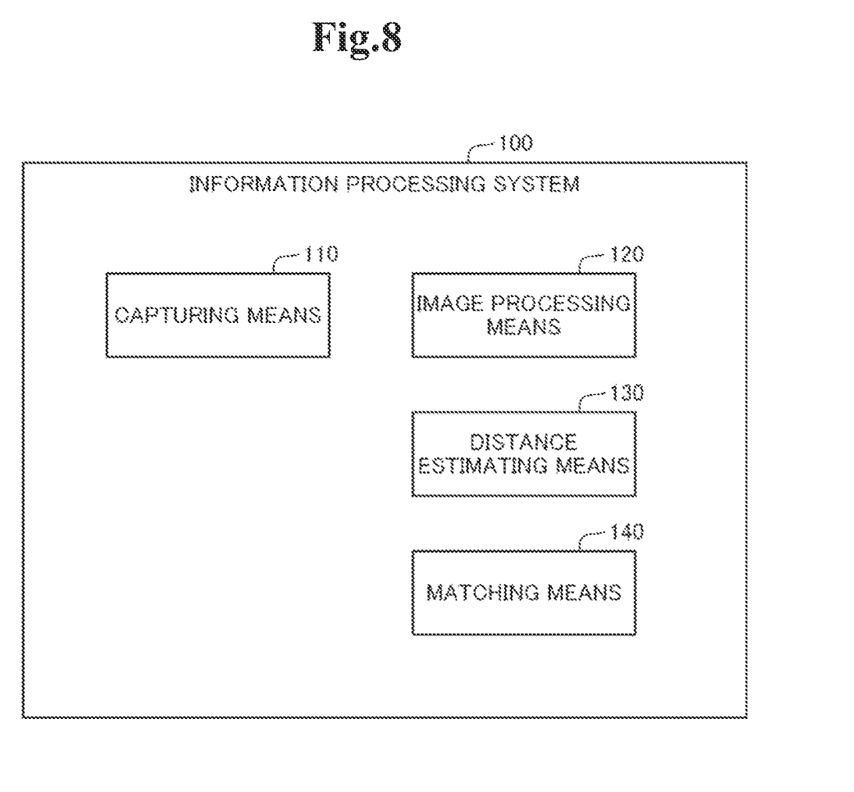
FIG. 8 is a block diagram showing the configuration of an information processing system in a third example embodiment of the present invention.
Figure 9:
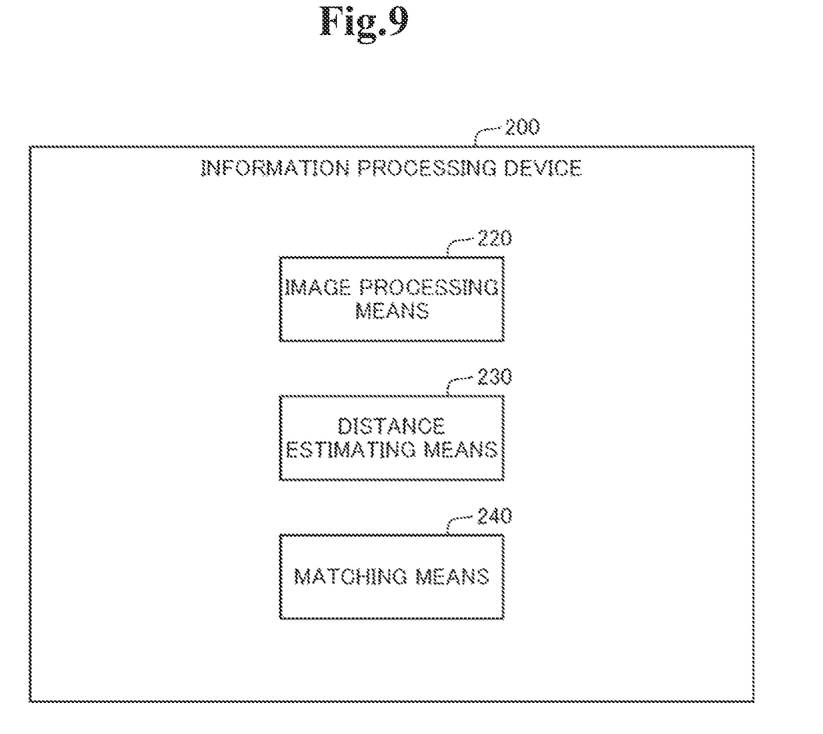
FIG. 9 is a block diagram showing the configuration of an information processing device in the third example embodiment of the present invention.

Next, a third example embodiment of the present invention will be described with reference to FIGS. 8 and 9. FIG. 8 is a block diagram showing the configuration of an information processing system in the third example embodiment. FIG. 9 is a block diagram showing the configuration of an information processing device in the third example embodiment. In this example embodiment, the overview of the configuration of the face authentication system described in the first and second example embodiments will be illustrated.

As shown in FIG. 8, an information processing system 100 in this example embodiment includes: a capturing means 110 that acquires a captured image obtained by capturing a pre-passing side region with reference to a gate; an image processing means 120 that extracts a feature value of an object within the captured image and stores matching information used for matching of the object based on the feature value; a distance estimating means 130 that estimates a distance from the gate to the object within the captured image; and a matching means 140 that executes matching determination based on the estimated distance and the stored matching information of the object that the distance has been estimated.

Further, in this example embodiment, the capturing means 110 may be eliminated from the information processing system 100 shown in FIG. 8.

That is to say, an information processing device 200 in this example embodiment includes: an image processing means 220 that extracts a feature value of an object within a captured image obtained by capturing a pre-passing side region with reference to a gate and stores matching information used for matching of the object based on the feature value; a distance estimating means 230 that estimates a distance from the gate to the object within the captured image; and a matching means 240 that executes matching determination based on the estimated distance and the stored matching information of the object that the distance has been estimated.

The image processing means 120, 220, the distance estimating means 130, 230 and the matching means 140, 240 described above may be structured by execution of a program by an arithmetic device, or may be structured by electronic circuits.

Then, the information processing system 100 and the information processing device 200 with the above configurations each operate to execute: a process of extracting a feature value of an object within a captured image obtained by capturing a pre-passing side region with reference to a gate, and storing matching information used for matching of the object based on the feature value; estimating a distance from the gate to the object within the captured image; and executing matching determination based on the estimated distance and the stored matching information of the object that the distance has been estimated.

The information processing system 100 and the information processing device 200 described above each extract a feature value from a face region of an object beforehand in a pre-passing side region with reference to a gate and execute a matching process beforehand using the feature value, and executes matching determination immediately before the gate, so that it is possible to properly open and close the gate for the person. Moreover, the information processing system 100 and the information processing device 200 each extracts a feature value of a person from a captured image captured at any timing when the person heads to the gate and stores the feature value, so that it is possible to extract a highly reliable feature value and execute matching with accuracy. As a result, it is possible to realize that the person smoothly passes through the gate.

<Supplementary Notes>

The whole or part of the example embodiments disclosed above can be described as the following supplementary notes. Below, the overview of the configurations of the information processing device, the information processing system, the program and the information processing method according to the present invention will be described. However, the present invention is not limited to the following configurations (Supplementary Note 1)

An information processing device comprising:

an image processing means that extracts a feature value of an object within a captured image obtained by capturing a pre-passing region of a gate, and stores matching information relating to matching of the object based on the feature value;

a distance estimating means that estimates a distance from the gate to the object within the captured image; and a matching means that executes matching determination based on the estimated distance and the stored matching information of the object that the distance has been estimated.

(Supplementary Note 2)

The information processing device according to Supplementary Note 1, wherein the matching means executes a matching process of matching between the feature value that is the stored matching information of the object that the distance has been estimated and a previously registered feature value, based on the estimated distance.

(Supplementary Note 3)

The information processing device according to Supplementary Note 2, wherein the matching means executes a matching process of matching between the stored feature value of the object located at a preset distance to the gate and the previously registered feature value.

(Supplementary Note 4)

The information processing device according to Supplementary Note 2 or 3, wherein the matching means executes a matching process of matching between the stored feature value of the object located closest to the gate and the previously registered feature value.

(Supplementary Note 5)

The information processing device according to Supplementary Note 1, wherein:

the image processing means executes a matching process of matching between the stored feature value and a previously registered feature value, and stores a result of the matching as the matching information; and the matching means executes the matching determination based on the estimated distance and the result of the matching that is the stored matching information of the object that the distance has been estimated.

(Supplementary Note 6)

The information processing device according to any of Supplementary Notes 1 to 5, wherein the image processing means performs extraction of the feature value of the object in a plurality of captured images, and updates and stores the matching information of the object based on the feature value.

(Supplementary Note 7)

The information processing device according to any of Supplementary Notes 1 to 6, wherein the distance estimating means estimates the distance to the object within the pre-passing region of the gate by using information which is different from the captured image for extracting the feature value.

(Supplementary Note 8)

The information processing device according to any of Supplementary Notes 1 to 6, wherein the distance estimating means estimates the distance to the object within the captured image by using an image portion of the object.

(Supplementary Note 9)

The information processing device according to Supplementary Note 8, wherein the distance estimating means identifies an attribute of the object within the captured image, sets a reference value corresponding to the attribute, and estimates the distance to the object within the captured image by using the reference value.

(Supplementary Note 10)

The information processing device according to Supplementary Note 9, wherein the distance estimating means detects object information representing a feature of the object within the captured image, and estimates the distance to the object within the captured image based on the reference value and the object information.

(Supplementary Note 11)

The information processing device according to Supplementary Note 10, wherein the distance estimating means detects a size of a predetermined site of the object within the captured image as the object information, and estimates the distance to the object within the captured image based on the size of the predetermined site of the object with reference to the reference value.

(Supplementary Note 12)

An information processing system comprising:

a capturing means that acquires a captured image obtained by capturing a pre-passing region of a gate;

an image processing means that extracts a feature value of an object within the captured image, and stores matching information relating to matching of the object based on the feature value;

a distance estimating means that estimates a distance from the gate to the object within the captured image; and a matching means that executes matching determination based on the estimated distance and the stored matching information of the object that the distance has been estimated.

(Supplementary Note 12.1)

The information processing system according to Supplementary Note 12, wherein the matching means executes a matching process of matching between the stored feature value of the object located at a preset distance to the gate and the previously registered feature value.

(Supplementary Note 12.2)

The information processing system according to Supplementary Note 12 or 12.1, wherein the matching means executes a matching process of matching between the stored feature value of the object located closest to the gate and the previously registered feature value.

(Supplementary Note 13)

A program comprising instructions for causing an information processing device to realize:

an image processing means that extracts a feature value of an object within a captured image obtained by capturing a pre-passing region of a gate, and stores matching information relating to matching of the object based on the feature value;

a distance estimating means that estimates a distance from the gate to the object within the captured image; and a matching means that executes matching determination based on the estimated distance and the stored matching information of the object that the distance has been estimated.

(Supplementary Note 13.1)

The program according to Supplementary Note 13, wherein the matching means executes a matching process of matching between the stored feature value of the object located at a preset distance to the gate and the previously registered feature value.

(Supplementary Note 13.2)

The program according to Supplementary Note 13 or 13.1, wherein the matching means executes a matching process of matching between the stored feature value of the object located closest to the gate and the previously registered feature value.

(Supplementary Note 14)

An information processing method comprising:

extracting a feature value of an object within a captured image obtained by capturing a pre-passing region of a gate, and storing matching information relating to matching of the object based on the feature value;

estimating a distance from the gate to the object within the captured image; and executing matching determination based on the estimated distance and the stored matching information of the object that the distance has been estimated.

(Supplementary Note 15)

The information processing method according to Supplementary Note 14, comprising executing a matching process of matching between the feature value that is the stored matching information of the object that the distance has been estimated and a previously registered feature value, based on the estimated distance.
(Supplementary Note 16)

The information processing method according to Supplementary Note 15, comprising executing a matching process of matching between the stored feature value of the object located at a preset distance to the gate and the previously registered feature value.
(Supplementary Note 17)

The information processing method according to Supplementary Note 15 or 16, comprising executing a matching process of matching between the stored feature value of the object located closest to the gate and the previously registered feature value.
(Supplementary Note 18)

The information processing method according to any of Supplementary Notes 15 to 17, comprising estimating the distance to the object within the pre-passing region of the gate by using information which is different from the captured image for extracting the feature value.
(Supplementary Note 19)

The information processing method according to any of Supplementary Notes 15 to 17, comprising estimating the distance to the object within the captured image by using an image portion of the object.
(Supplementary Note 19.1)

The information processing method according to Supplementary Note 19, comprising identifying an attribute of the object within the captured image, setting a reference value corresponding to the attribute, and estimating the distance to the object within the captured image by using the reference value.
(Supplementary Note 19.2)

The information processing method according to Supplementary Note 19.1, comprising detecting object information representing a feature of the object within the captured image, and estimating the distance to the object within the captured image based on the reference value and the object information.
(Supplementary Note 19.3)

The information processing method according to Supplementary Note 19.2, comprising detecting a size of a predetermined site of the object within the captured image as the object information, and estimating the distance to the object within the captured image based on the size of the predetermined site of the object with reference to the reference value.

The program described above can be stored using various types of non-transitory computer-readable mediums and supplied to a computer. The non-transitory computer-readable mediums include various types of tangible storage mediums. Examples of the non-transitory computer-readable mediums include a magnetic recording medium (for example, a flexible disk, a magnetic tape, a hard disk drive), a magneto-optical recording medium (for example, a magneto-optical disk), a CD-ROM (Read Only Memory), a CD-R, a CD-R/W, and a semiconductor memory (for example, a mask ROM, a PROM (Programmable ROM), an EPROM (Erasable PROM), a flash ROM, a RAM (Random Access Memory). The program may be supplied to a computer by various types of transitory computer-readable mediums. Examples of the transitory computer-readable mediums include electric signals, optical signals, and electromagnetic waves. The transitory computer-readable medium can supply a program to a computer via a wired communication path such as an electric line and an optical fiber, or a wireless communication path.

Although the present invention has been described above with reference to the example embodiments, the present invention is not limited to the example embodiments described above. The configurations and details of the present invention can be changed in various manners that can be understood by one skilled in the art within the scope of the present invention.

The present invention is based upon and claims the benefit of priority from Japanese patent application No. 2018-014275, filed on Jan. 31, 2018, the disclosure of which is incorporated herein in its entirety by reference.

DESCRIPTION OF NUMERALS 10 face authentication system
11 feature value extraction unit
12 distance measurement unit
13 matching unit
14 gate control unit
15 feature value storage unit
16 matching data storage unit
100 information processing system
200 information processing device
110 capturing means
120, 220 image processing means
130, 230 distance estimating means
140, 240 matching means
C capture device
D display device
E rangefinder
G gate

The invention claimed is:

1. An information processing device comprising:
at least one memory configured to store instructions; and
at least one processor configured to execute instructions to:
extract a feature value of an object in a captured image obtained by capturing a pre-passing region of a gate before the object is located in a predetermined range, the predetermined range being set immediately in front of the gate and located at a preset distance from the gate, and store matching information relating to matching of the object based on the feature value;
estimate a distance from the gate to the object in the captured image; and
based on the estimated distance, perform a matching determination by using the stored matching information of the object located in the predetermined range with respect to the gate.

2. The information processing device according to claim 1, wherein the at least one processor is configured to execute the instructions to
perform a matching process between the feature value that is the stored matching information of the object to which the distance from the gate has been estimated and a previously registered feature value, based on the estimated distance.

3. The information processing device according to claim 2, wherein the at least one processor is configured to execute the instructions to
perform a matching process between the stored feature value of the object located at the preset distance from the gate and the previously registered feature value.

4. The information processing device according to claim 2, wherein the at least one processor is configured to execute the instructions to
perform a matching process between the stored feature value of the object located closest to the gate and the previously registered feature value.

5. The information processing device according to claim 1, wherein the at least one processor is configured to execute the instructions to:
perform a matching process between the stored feature value and a previously registered feature value, and store a matching result as the matching information; and
perform the matching determination based on the estimated distance and the matching result that is the stored matching information of the object to which the distance from the gate has been estimated.

6. The information processing device according to claim 1, wherein the at least one processor is configured to execute the instructions to
extract the feature value of the object in each of a plurality of the captured images, and update and store the matching information of the object based on the feature value as extracted in each of the plurality of the captured images.

7. The information processing device according to claim 1, wherein the at least one processor is configured to execute the instructions to
estimate the distance to the object from the gate in the pre-passing region of the gate by using information that is different from the captured image in which the feature value has been extracted.

8. The information processing device according to claim 1, wherein the at least one processor is configured to execute the instructions to
estimate the distance to the object from the gate by using an image portion of the object in the captured image.

9. The information processing device according to claim 8, wherein the at least one processor is configured to execute the instructions to
identify an attribute of the object in the captured image, set a reference value corresponding to the attribute, and estimate the distance to the object from the gate in the captured image by using the reference value.

10. The information processing device according to claim 9, wherein the at least one processor is configured to execute the instructions to
detect object information representing a feature of the object in the captured image, and estimate the distance to the object from the gate in the captured image based on the reference value and the object information.

11. The information processing device according to claim 10, wherein the at least one processor is configured to execute the instructions to
detect a size of a predetermined part of the object in the captured image as the object information, and estimate the distance to the object from the gate in the captured image based on the size of the predetermined part of the object with respect to the reference value.

12. An information processing method comprising:
extracting, by a processor, a feature value of an object in a captured image obtained by capturing a pre-passing region of a gate before the object is located in a predetermined range, the predetermined range being set immediately in front of the gate and located at a preset distance from the gate, and store matching information relating to matching of the object based on the feature value;
estimating, by the processor, a distance from the gate to the object in the captured image; and
based on the estimated distance, performing, by the processor, matching a determination by using the stored matching information of the object located in the predetermined range with respect to the gate.

13. The information processing method according to claim 12, further comprising
performing, by the processor, a matching process between the feature value that is the stored matching information of the object to which the distance from the gate has been estimated and a previously registered feature value, based on the estimated distance.

14. The information processing method according to claim 13, further comprising
performing, by the processor, a matching process between the stored feature value of the object located at the preset distance from the gate and the previously registered feature value.

15. The information processing method according to claim 13, further comprising
performing, by the processor, a matching process between the stored feature value of the object located closest to the gate and the previously registered feature value.

16. The information processing method according to claim 12, further comprising
estimating, by the processor, the distance to the object from the gate in the pre-passing region of the gate by using information that is different from the captured image in which the feature value has been extracted.

17. The information processing method according to claim 12, further comprising
estimating, by the processor, the distance to the object from the gate by using an image portion of the object in the captured image.

18. A non-transitory computer-readable medium storing thereon a program comprising instructions for causing an information processing device to execute processing to:
extract a feature value of an object in a captured image obtained by capturing a pre-passing region of a gate before the object is located in a predetermined range, the predetermined range being set immediately in front of the gate and located at a preset distance from the gate, and store matching information relating to matching of the object based on the feature value;
estimate a distance from the gate to the object in the captured image; and
based on the estimated distance, perform a matching determination by using the stored matching information of the object located in the predetermined range with respect to the gate.

* * * * *